(12) United States Patent
Hein et al.

(10) Patent No.: US 10,325,330 B2
(45) Date of Patent: Jun. 18, 2019

(54) METHOD AND APPARATUS FOR WELL ABANDONMENT

(71) Applicant: Landmark Graphics Corporation, Houston, TX (US)

(72) Inventors: Caty LaVonne Hein, Spring, TX (US); Darrin Seulakhan, Cypress, TX (US); Bridget Morgan Lawrence, Morrison, CO (US); Robert Milton Hull, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 445 days.

(21) Appl. No.: 14/911,560

(22) PCT Filed: Oct. 17, 2013

(86) PCT No.: PCT/US2013/065475
§ 371 (c)(1),
(2) Date: Feb. 11, 2016

(87) PCT Pub. No.: WO2015/057232
PCT Pub. Date: Apr. 23, 2015

(65) Prior Publication Data
US 2016/0189318 A1    Jun. 30, 2016

(51) Int. Cl.
*G06Q 50/06* (2012.01)
*E21B 29/00* (2006.01)
(Continued)

(52) U.S. Cl.
CPC ............. *G06Q 50/06* (2013.01); *E21B 29/00* (2013.01); *E21B 33/00* (2013.01); *E21B 47/00* (2013.01);
(Continued)

(58) Field of Classification Search
CPC ......... G06Q 10/00; G06Q 40/06; G06F 17/60
(Continued)

(56) References Cited

U.S. PATENT DOCUMENTS 3,079,085 A * 2/1963 Clark, Jr. ................. G06G 7/57
                                                              703/10
5,101,895 A * 4/1992 Gilbert ................. E21B 23/006
                                                             166/55.8
(Continued)

FOREIGN PATENT DOCUMENTS

WO    WO-2015057232 A1    4/2015

OTHER PUBLICATIONS

Guidance for Well and Boring Abandonment "Maine Department of Environmental Protection Bureau of Remediation and Waste Management Division of Technical Services". Jan. 9, 2009, pp. 1-7.*
(Continued)

*Primary Examiner* — Romain Jeanty

(57) ABSTRACT

Systems and methods facilitate and automate well abandonment procedures. In an embodiment, well field data for a plurality of wells is categorized into well types. An inspection set of wells, including wells of each type, is determined from the entire plurality of wells. Inspection data is collected for each well type, including environmental, regulatory, and well condition data. The inspection data is extrapolated onto wells with similar types for the entire filed and analyzed. The analysis may include determining an optimal sequence of well abandonment activities, and an estimate of costs for abandoning each well, all wells of each type, and the entire well field. In an embodiment, a risk assessment analysis is performed and may include an analysis of factors that may change the cost of abandoning the well field or a sequence of well abandonment activities.

18 Claims, 5 Drawing Sheets

(51) Int. Cl.
*E21B 33/00* (2006.01)
*E21B 47/00* (2012.01)
*G06Q 10/06* (2012.01)

(52) U.S. Cl.
CPC ... *G06Q 10/0637* (2013.01); *G06Q 10/06314* (2013.01); *G06Q 10/06315* (2013.01)

(58) Field of Classification Search
USPC .......................................................... 705/7.19
See application file for complete search history.

(56) References Cited

U.S. PATENT DOCUMENTS

| | | | | |
|---|---|---|---|---|
| 5,667,010 | A * | 9/1997 | Boyd | E21B 33/134 166/192 |
| 6,266,788 | B1 | 7/2001 | Othmer | |
| 7,380,603 | B2 * | 6/2008 | Jeffrey | E21B 23/01 166/285 |
| 7,640,965 | B2 * | 1/2010 | Bosma | E21B 29/10 164/80 |
| 9,708,882 | B2 * | 7/2017 | Carragher | E21B 23/00 |
| 9,822,629 | B2 * | 11/2017 | Suparman | E21B 29/00 |
| 2003/0038734 | A1 * | 2/2003 | Hirsch | E21B 43/00 340/853.1 |
| 2003/0220742 | A1 | 11/2003 | Niedermayr et al. | |
| 2005/0263282 | A1 | 12/2005 | Jeffrey et al. | |
| 2012/0232859 | A1 * | 9/2012 | Pomerantz | G01V 99/005 703/2 |
| 2013/0098605 | A1 | 4/2013 | Dirksen | |
| 2014/0214387 | A1 * | 7/2014 | Tilke | E21B 43/305 703/10 |

OTHER PUBLICATIONS

Marine Department of Environmental Protection Bureau of Remediation and Waste Management Division of Technical Services "Guidance for Well Boring Abandonment", Jan. 4, 2004, pp. 1-8 (Year: 2004).*
"International Application Serial No. PCT/US2013/065475, International Search Report dated Jul. 10, 2014", 3 pgs.
"International Application Serial No. PCT/US2013/065475, Written Opinion dated Jul. 10, 2014", 6 pgs.
Marsh, Michael, "New Brunswick Onshore Oil and Natural Gas well Abandonment Study", Petroleum Research Atlantic Canada (PRAC), (2004), 1,8,15,21 pgs.

* cited by examiner

METHOD AND APPARATUS FOR WELL ABANDONMENT

PRIORITY APPLICATION

This application is a U.S. National Stage Filing under 35 U.S.C. 371 from International Application No. PCT/US2013/065475, filed on 17 Oct. 2013, and published as WO 2015/057232 on 23 Apr. 2015, which application and publication are incorporated herein by reference in their entirety.

BACKGROUND

In mature oil and gas fields and the like, well abandonment is an inevitable procedure that eventually takes place for every well. This process can be tedious, time consuming, expensive and prone to errors. During well abandonment an entire well stock may be reviewed. This review could include considerable time being spent on evaluating individual wells in order to determine appropriate procedures and requirements for well abandonment solutions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DESCRIPTION OF EXAMPLE EMBODIMENTS

Figure 1:
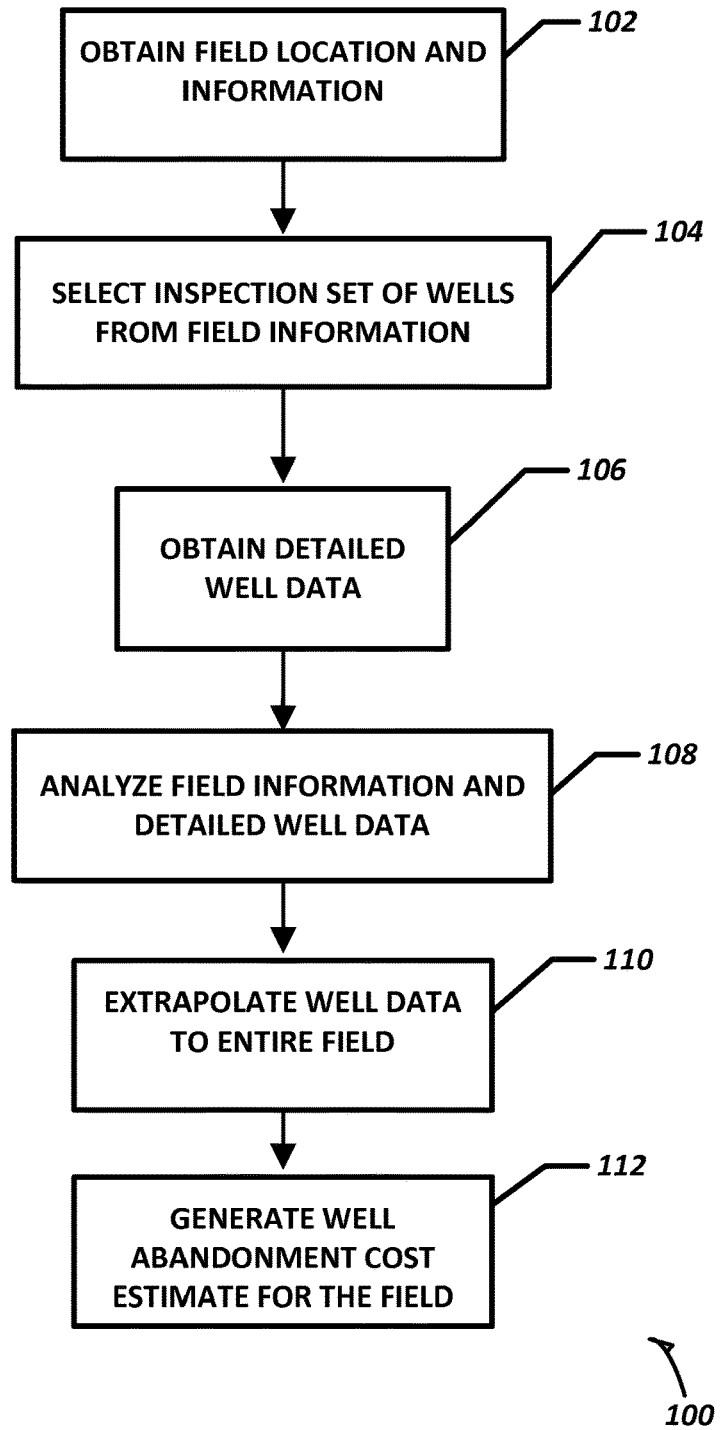
FIG. 1 is a flow chart illustrating an example method of a well abandonment estimation procedure in accordance with some embodiments.

There is a need for a methodology, systems and workflow procedures that provide guidance to expedite and streamline the process of well flow abandonment. For example, identifying a dominant pattern of a subset of wells in a field or region, and the applying those patterns across the entire well stock, or to a selected portion thereof. Abandonment processes may be adjusted and applied to any well field in any geographic location. Additionally, the application of a predictable and repeatable methodology to well abandonment procedures and time/cost estimations will help to align customer expectations with the deliverables of a well abandonment study and the well abandonment activities.

A well abandonment study may provide a logical process may include multiple segments, such as various forms of data screening, condition identification, general solution generation, and preliminary analysis, and potentially other analysis segments. The study may conclude with a detailed report that provides a well abandonment execution plan.

Data screening is an initial segment that may involve gathering and screening the appropriate information from a list of wells that will be considered for abandonment. Data gathering can provide important information about the well field abandonment project. However, data screening is time consuming and may be difficult when reliable data is sparse, for example in a mature field where well conditions may have changed over time. Data screening will include data pertinent to one or more reservoir properties or indications of performance, such as, for example, collecting pore pressure/fracture gradient data, lithology columns, and the rate of production from some or all of the wells in the list of wells.

Condition identification includes reviewing well conditions to identify factors that will impact the equipment, time and cost elements, such as mechanical issues, cement bond verification, and other well specific parameters that may impact the well abandonment workflow. Thus, such condition verification may include, for example, any one or more of verification of an annular cement bond, environmental condition checks, completion method checks, placement and volume requirement checks, determination of a physical cement requirement, determination of a well control pressure requirement, and identification of water zone, hydrocarbons, and sulphur zones; and of such operations may be performed individually, sequentially, or simultaneously.

General solution generation may begin with constructing one or more proposed abandonment schematics and procedures of the recommended activities based on the identified conditions. In some examples, an initial peer review process may be utilized to ensure quality assurance and quality control. The generation of a general solution to the well abandonment issues may also serve as a point to align the study with a client's expectations. For example, a determination of whether one or more wells have good bonds or if the well(s) need remediation, a determination of whether or not a rig is required for the abandonment process for one or more wells, a determination of an appropriate cementing solution for any identified environmental conditions and well completion methods, and a determination of a number of plugs with an adequate volume are available, may all be utilized to compute a base cost for well abandonment activities.

A preliminary analysis and decision segment may include decisions regarding equipment availability that may need to be confirmed. The entire well stock is reviewed for similarities, and the data from the analyzed wells is extrapolated to the entire well stock. For example, wells may be divided between those requiring a rig for abandonment and those where abandonment may be accomplished without a rig. The preliminary analysis may also include performing a site visit to gather well specific information from a subset of the total number of wells to be abandoned. The well specific information from the subset of wells may then be extrapolated over the remaining wells that have similar identified characteristics.

The development of a detailed study may include the identification of the specific equipment needed, for example, the type of rig(s) that may be necessary for the abandonment procedures. Additionally, an abandonment time duration estimation and cost analysis are performed based on the well specific information, identified characteristics and the extrapolated data.

A provider coordination stage may include a review of timelines and resource availability with various well abandonment providers (e.g., product service lines (PSL)) in order to establish and recommend a realistic abandonment sequence. Throughout the execution of the abandonment process, the operations may be optimized in order to reduce the total abandonment time.

A final deliverables stage may include presenting a final draft report to a client (e.g., well owner) for review and additional feedback. Then any final feedback may be incorporated and a final report is generated. Finally, the execution of a well abandonment process may begin after a detailed review of the abandonment study and findings is performed.

FIG. 1 is a flow chart illustrating an example method of a well abandonment estimation procedure 100 in accordance with some embodiments. At 102, an abandonment estimation system may obtain field location and information. In an example, well data may be gathered from an existing database of well data or entered into a processing system by an inspector at a well site. The field location and information may include either or both geographical regions (e.g., North Sea, Gulf of Mexico, etc.) or precise geographical locations such as latitude and longitude coordinates.

At 104, the abandonment estimation system may select an inspection set of wells from the field information. The selection may be based on a random sampling of a specified number or percentage of wells, entered manually by a user (e.g., based on a mutual agreement with or specific request by the well owner), or a combination of manual selection and automated sampling.

At 106, the abandonment estimation system may obtain detailed well data. The detailed well data may include, for example, a well history, a workover history, a lithology, a well number, a well schematic, a well type, or any other or additional information that may impact or inform the well abandonment process. The detailed well data may be retrieved automatically from an existing database of well information by the abandonment estimation system, imported from a separate system or database, or entered by a user based on an inspection of one or more individual wells.

At 108, the abandonment estimation system analyzes the field information and the detailed well data. The analysis may include categorizing the wells in the field into two or more separate categories or types. The separate categories or types may be based, for example, on the location, environmental conditions, complexity, and anticipated abandonment procedures or resources for each individual well. Each of the separate categories or types may be defined to generally contain wells with similar time and financial costs for abandonment.

At 110, the abandonment estimation system may extrapolate the well data to the entire field of wells. The extrapolation may include assigning a category or type to individual wells that have similar known characteristics to wells where detailed data was obtained. For example, all wells where a rig is needed for abandonment may be combined into a first type, and all rigless wells may be combined into a second type. The types may be further subdivided based on the type, condition or complexity of specific wells.

At 112, the abandonment estimation system may generate a well abandonment cost estimate for the field. The abandonment cost estimate may include details specific for each category or type of well, as well as the individual well. The abandonment cost estimate may include, and be based on, various phases or activities that are needed during the well abandonment process. For example, separate costs, work duration, and activities may be associated with the phases of reservoirs abandonment, intermediate abandonment and well conductor removal, during the well abandonment process.

Though arranged serially in the example of FIG. 1, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 2:
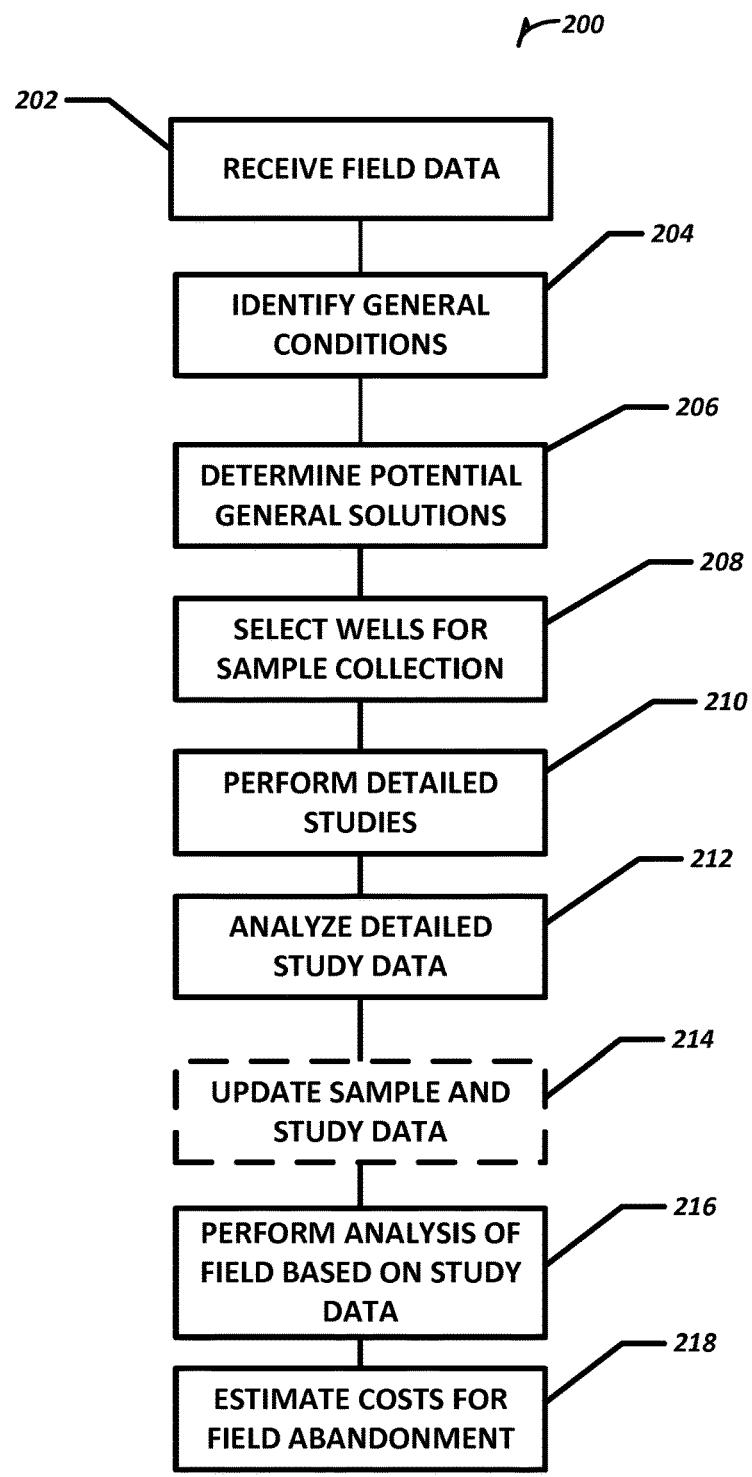
FIG. 2 is a flow chart illustrating an example method of a well assessment procedure in accordance with some embodiments.

FIG. 2 is a flow chart illustrating an example method of a well assessment procedure 200 in accordance with some embodiments. The well assessment procedure may be performed by one or more computer systems. At 202, a server may receive field data associated with a collection of wells. The field and well data may be stored in a database coupled to the server. The server may receive the field data or well data over a network (e.g., the Internet) from one or more wired or wireless devices.

At 204, the server may be configured to identify general conditions among the wells from the field data. The general conditions may include factors that will impact the equipment, time and cost elements, such as mechanical issues, location of each well, well types, governmental regulations or requirements, environmental conditions and other well specific parameters that may impact the well abandonment workflow.

At 206, the server may be configured to determine potential general solutions for well abandonment. For example, a determination may be made as to whether one or more wells have good bonds or if the need remediation, a determination of whether or not a rig is required for the abandonment process for one or more wells, a determination of an appropriate cementing solution for any identified environmental conditions and well completion methods, and any other specific equipment or processes that may needed to abandon a specific well type.

At 208, the server may select wells for sample collection. The sample collection may include a detailed analysis for one or more wells that are to be abandoned. In another example, the sample collection may be based on one or more wells where a recent survey of the wells and their conditions was obtained. The server may also be configured to receive an input that specifies one or more wells that will be part of a detailed well study.

At 210, an inspector, abandonment engineer, or other user may perform a detailed study of the one or more wells that were selected at 208. The results of the detail study may be provided to the server to supplement or update any existing data corresponding to one or more wells in the database.

At 212, the server may analyze the detailed study data. The analysis may compare the detailed study data with the field data in order to determine whether sufficient detailed data was collected to create a sufficient set of extrapolated data by abstracting the detailed study data to any wells where detailed study data is unavailable or was not collected.

Optionally, at 214, the server may receive an update of the sample and study data. For example, if at 212, the server determined that insufficient data was collected, or that the quality or confidence level of the data was insufficient, the server may request that supplemental detailed study data be collected and provided.

At 216, the server may perform an analysis of the field information based on the detailed study data. The analysis may include categorizing the wells in the field into two or more separate categories or types. The separate categories or types may be based, for example, on the location, environmental conditions, complexity, and anticipated abandonment procedures or resources for each individual well. Each of the separate categories or types may be defined to generally contain wells with similar time and financial costs for abandonment. The analysis may include an extrapolation of the well data to the entire field of wells. The extrapolation may include assigning a category or type to individual wells that have similar known characteristics to wells where detailed data was obtained. For example, all wells where a rig is needed for abandonment may be combined into a first type, and all rigless wells may be combined into a second type. The types may be further subdivided based on the type, condition or complexity of specific wells.

At 218, the server may estimate any costs for field abandonment. The cost estimate may include details specific for each category or type of well, as well as the individual well. The cost estimate may include, and be based on, various phases or activities that are needed during the well abandonment process. For example, separate costs, work duration, and activities may be associated with the phases of reservoirs abandonment, intermediate abandonment and well conductor removal, during the well abandonment process.

Though arranged serially in the example of FIG. 2, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 3:
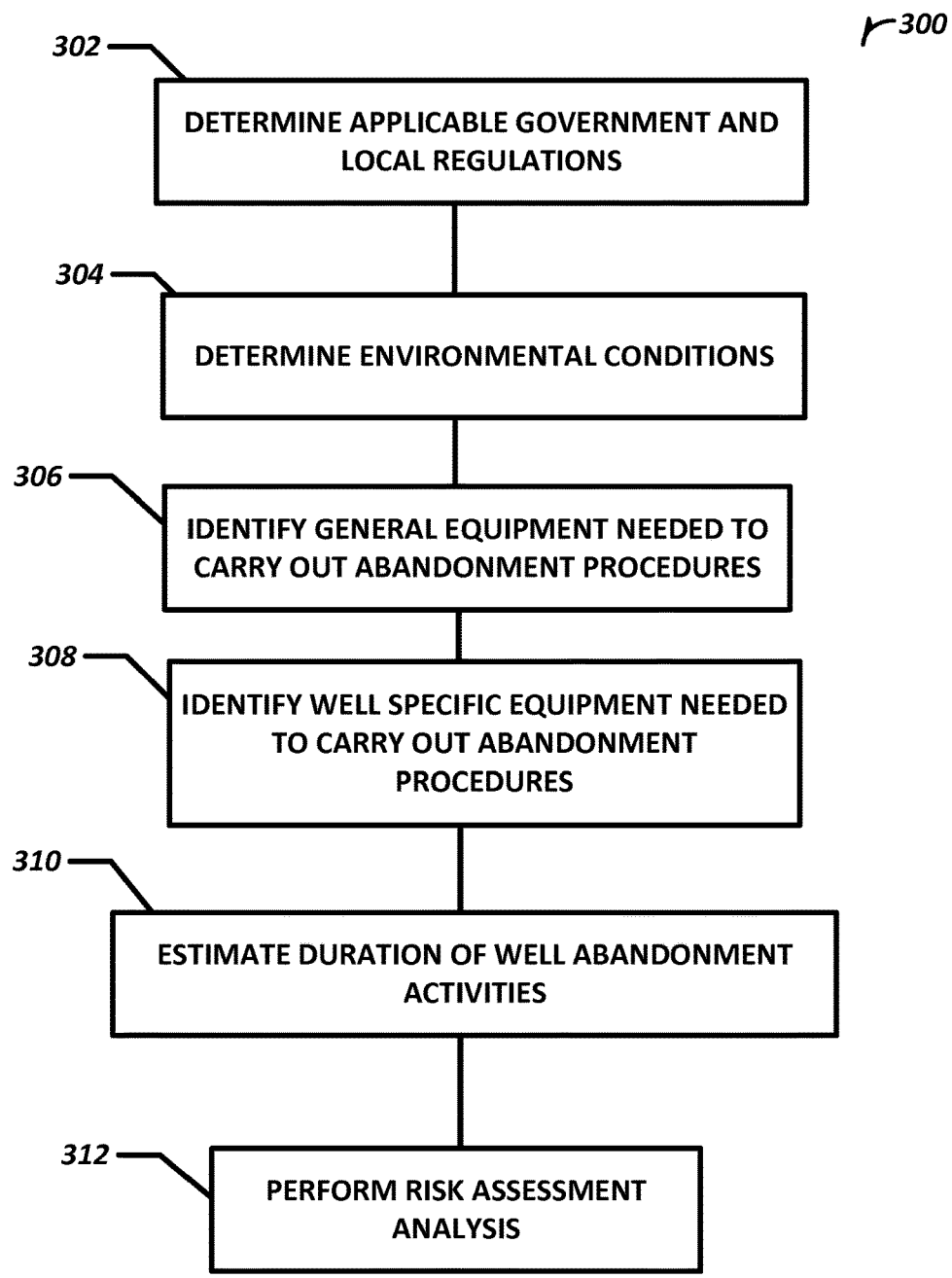
FIG. 3 is a flow chart illustrating an example method of a well environment assessment procedure in accordance with some embodiments.

FIG. 3 is a flow chart illustrating an example method of a well environment assessment procedure 300 in accordance with some embodiments. In an example, procedure 300 may be incorporated with the well abandonment estimation procedure 100 of FIG. 1 or the well assessment procedure 200 of FIG. 2 in order to provide a detailed assessment of one or more wells.

At 302, a system or user may determine applicable government and local regulations. Example regulations may include the required placement or volume of physical cement needed to abandon a well. In an example regulations may be organized by level of compliance required to meet or exceed all required regulations. For example, if a local regulation is more stringent than a regional regulation the local regulation will be utilized for cost and time estimation purposes; similarly, if the regional regulation is more stringent than the local regulation the regional regulation will be utilized.

At 304, any environmental conditions, (e.g., well depth below sea level, nominal wave heights, etc.) may be determined. The environmental conditions may indicate equipment, supplies, or materials that may be needed to abandon a specific well. For example, a selection of an appropriate cementing solution may be dependent on one or more of the determined environmental conditions.

At 306, any general equipment needed to carry out abandonment procedures may be identified. At 308, any well specific equipment needed to carry out abandonment procedures may be identified. For example, a well may be situated such that a well rig will be needed to safely perform one or more abandonment procedures.

At 310, an estimate of duration of well abandonment activities may be performed. The estimate may be based, for example, on the amount of time that was spent performing the various procedures to abandon similar wells. The estimate may also be divided into phases based on the availability or likely availability of specific equipment or workers to perform one or more of the abandonment procedures.

At 312, a risk assessment analysis may be performed. The risk assessment analysis may include allowances for uncontrollable factors such as weather, or unpredictable factors such as equipment breakage, work stoppage, or the unavailability of workers, equipment or supplies.

Though arranged serially in the example of FIG. 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 4:
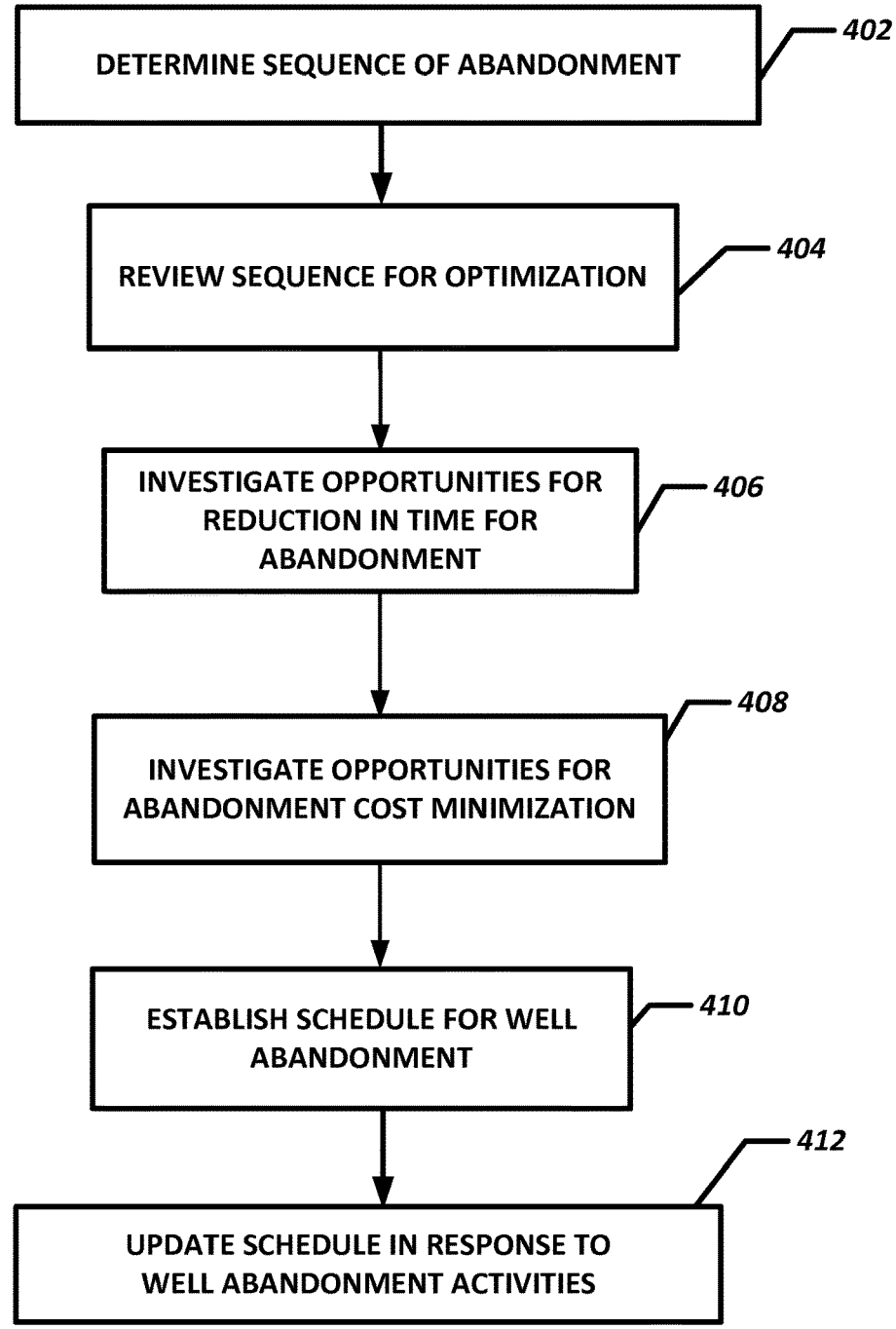
FIG. 4 is a flow chart illustrating an example method of a well abandonment scheduling procedure, in accordance with some embodiments.

FIG. 4 is a flow chart illustrating an example method of a well abandonment scheduling procedure 400, in accordance with some embodiments. In an example, procedure 400 may be incorporated with the well abandonment estimation procedure 100 of FIG. 1 or the well assessment procedure 200 of FIG. 2 in order to provide a schedule of abandonment for one or more wells or fields.

At 402, a well abandonment system may determine a sequence of abandonment. For example, the sequence may be based on the geographic location of wells, one or more various characteristics of individual wells, production output of the wells, the availability of resources with respect to one or more wells, or other factors.

At 404, the well abandonment system may review the sequence of abandonment for optimization. Optimizations may include any activity or adjustment that minimizes transitions between abandonment procedures or that minimizes risks for delay. For example, scheduling workers or contractors to alternate between two different well types may provide for time to transition equipment between wells of a similar type while the workers or contractors are performing an abandonment function on the type of well that is not in transition.

At 406, the well abandonment system may review the sequence of abandonment for optimization. Optimizations may include any activity or adjustment that shortens the time required to perform an abandonment procedure or that minimizes delays, or other time consumption.

At 408, the well abandonment system may review the sequence of abandonment for cost minimization. Minimization in cost may include any activity or adjustment that reduces the overall cost of the abandonment process as a whole, or the cost of abandoning one or more specific well types. For example, the well abandonment sequencing may be ordered such that wells with the lowest production output are abandoned before wells with higher production output, thereby minimizing the costs associated with maintaining lower production wells while maximizing the output of the higher production wells.

At 410, the well abandonment system may establish a schedule for well abandonment. The schedule may be based on the optimizations performed at 406 and 408, as well as any input preferences received from the well operator or owner.

At 412, the well abandonment system may update the schedule of well abandonment activities. The update may be performed in response to updated information received during well abandonment activities such that the well abandonment schedule is based on the most update and reliable information available to the well abandonment system.

Though arranged serially in the example of FIG. 4, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 5:
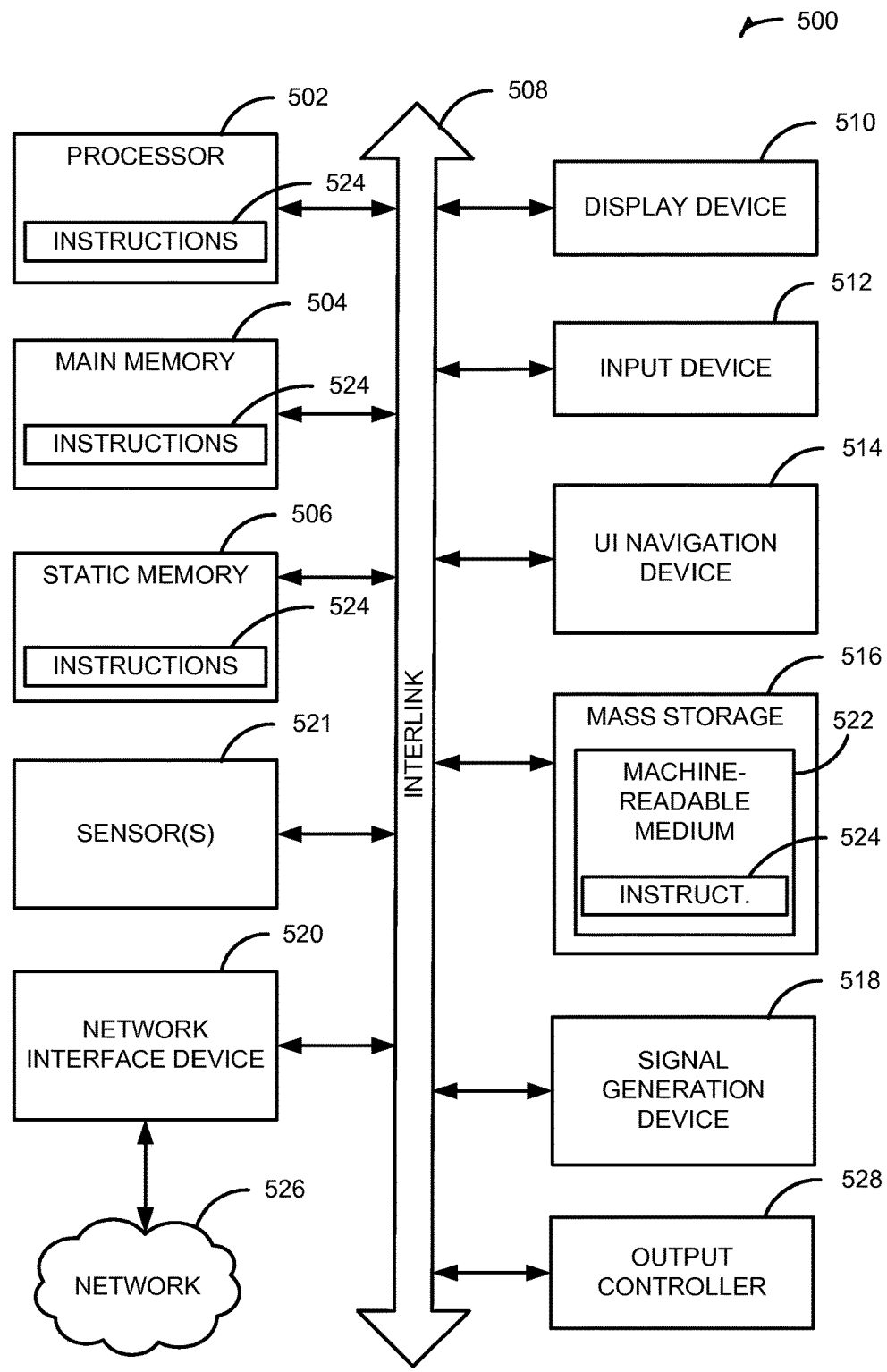
FIG. 5 is a block diagram illustrating an example machine upon which any one or more of the techniques discussed herein may be performed.

FIG. 5 is a block diagram illustrating an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via an interlink 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media used for storing data structures or instructions; and all such memory devices and storage media (whether discrete or integrated with other functionality, for example as cache memory) represent non-transitory media. Specific examples of machine-readable media may include: non-volatile memory, such as semiconductor memory devices (e.g., Electrically Programmable Read-Only Memory (EPROM), Dynamic Random Access Memory (DRAM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

What is claimed is:

1. A method of well abandonment comprising:
    receiving well field data at a processor, the well field data defining a set of wells for abandonment analysis;
    categorizing, by a field data analysis module of the processor, the set of wells into at least two well types;
    selecting, by the field data analysis module of the processor, a well inspection subset from the set of wells, the well inspection subset including at least one well of each of the at least two well types;
    receiving, at the processor, inspection data for each well in the well inspection subset;
    performing an analysis, by the processor, of the well inspection data, the analysis including an extrapolation of the inspection data from the well inspection subset to the set of wells;
    determining, by a field estimation module of the processor, an initial sequence of well abandonment activities for the set of wells;
    generating, by the field estimation module of the processor, an estimate of the cost of abandoning the set of wells based at least in part on the analysis of the inspection data and the initial sequence of well abandonment activities, the estimate of the cost of abandoning the set of wells distinguishes between the abandonment cost of the first well type and an abandonment cost of the second well type;
    wherein the at least two well types include a first well type with an first abandonment cost that is more than an second abandonment cost of a second well type; and
    executing, based on the estimate of the cost of abandoning the set of wells, well abandonment activities comprising using well-specific equipment to perform one or more abandonment procedures.

2. The method of claim 1, further comprising:
    receiving condition data that is specific to each of the at least two well types;
    wherein generating the estimate of the cost of abandoning the set of wells is based at least in part on the condition data.

3. The method of claim 1, further comprising receiving a set of environmental conditions that affect a set of well abandonment activities for the set of wells;
    wherein generating the estimate of the cost of abandoning the set of wells is based at least in part on the set of environmental conditions.

4. The method of claim 1, further comprising calculating an estimate of a duration of well abandonment activities for each well in the set of wells.

5. The method of claim 1, further comprising performing a risk assessment analysis on the sequence of well abandonment activities for the set of wells, the risk assessment analysis including an analysis of factors that may change the estimate of the cost of abandoning the set of wells or the initial sequence of well abandonment activities.

6. The method of claim 5, further comprising:
    determining an optimized sequence of well abandonment activities based at least in part on the initial sequence of well abandonment activities; and
    determining a schedule of well abandonment activities for each well in the set of wells, the schedule based at least in part on the optimized sequence of well abandonment activities.

7. A well abandonment system comprising:
    a field data collection module of a processor, the field data collection module configured to receive well field data, the well field data including a set of wells for abandonment analysis;
    a field data analysis module of the processor, the field data analysis module configured to categorize the set of wells into at least two well types, and select a well inspection subset from the set of wells, the well inspection subset including at least one well of each of the at least two well types;
    a well data collection module of the processor, the well data collection module configured to receive inspection data for each well in the well inspection subset;
    a well analysis module of the processor, the well analysis module configured to perform an analysis of the well inspection data, the analysis including an extrapolation of the inspection data from the well inspection subset to the set of wells;
    a field estimation module of the processor, the field estimation module configured to determine an initial sequence of well abandonment activities for the set of wells and generate an estimate of the cost of abandoning the set of wells based at least in part on the analysis of the inspection data and the initial sequence of well abandonment activities, the estimate of the cost of abandoning the set of wells distinguishes between the abandonment cost of the first well type and an abandonment cost of the second well type; and
    a user interface coupled to the field data collection module, the well data collection module, and the field estimation module, the user interface configured to present the estimate of the cost of abandoning the set of wells and cause execution, based on the estimate of the cost of abandoning the set of wells, of well abandonment activities for each well in the set of wells, the execution of the well abandonment activities comprising using well-specific equipment to perform one or more abandonment procedures;

wherein the at least two well types include a first well type with an first abandonment cost that is more than an second abandonment cost of a second well type.

8. The well abandonment system of claim 7, wherein the field data collection module configured to receive condition data that is specific to each of the at least two well types; and
wherein the field estimation module is further configured to generate an estimate of the cost of abandoning the set of wells based at least in part on the condition data.

9. The well abandonment generation system of claim 7, wherein the field data collection module configured to receive a set of environmental conditions that affect a set of well abandonment activities for the set of wells;
wherein the field estimation module is further configured to generate an estimate of the cost of abandoning the set of wells based at least in part on the set of environmental conditions.

10. The well abandonment generation system of claim 7, wherein the field estimation module is further configured to calculate an estimate of a duration of well abandonment activities for each well in the set of wells.

11. The well abandonment generation system of claim 7, wherein the field estimation module is further configured to perform a risk assessment analysis on the sequence of well abandonment activities for the set of wells, the risk assessment analysis including an analysis of factors that may change the estimate of the cost of abandoning the set of wells or the initial sequence of well abandonment activities.

12. The well abandonment generation system of claim 11, wherein the field estimation module is further configured to determine an optimized sequence of well abandonment activities based at least in part on the initial sequence of well abandonment activities, and to determine a schedule of well abandonment activities for each well in the set of well, the schedule based at least in part on the optimized sequence of well abandonment activities.

13. A tangible computer readable medium comprising instructions that when executed by a processor cause the processor to perform operations comprising:
receiving well field data, by a field data analysis module of the processor, the well field data including a set of wells for abandonment analysis;
categorizing, by the field data analysis module of the processor, the set of wells into at least two well types, and select a well inspection subset from the set of wells, the well inspection subset including at least one well of each of the at least two well types;
receiving, by a well data collection module of the processor, inspection data for each well in the well inspection subset;
performing, by a well analysis module of the processor, an analysis of the well inspection data, the analysis including an extrapolation of the inspection data from the well inspection subset to the set of wells;
determining, by a field estimation module, an initial sequence of well abandonment activities for the set of wells;
generating, by the field estimation module of the processor, an estimate of the cost of abandoning the set of wells based at least in part on the analysis of the inspection data and the initial sequence of well abandonment activities, the estimate of the cost of abandoning the set of wells distinguishes between the abandonment cost of the first well type and an abandonment cost of the second well type;
presenting, by a user interface coupled to the field data collection module, the well data collection module, and the field estimation module, the estimate of the cost of abandoning the set of wells on a display;
wherein the at least two well types include a first well type with an first abandonment cost that is more than an second abandonment cost of a second well type; and
causing execution, based on the estimate of the cost of abandoning the set of wells, the execution of the well abandonment activities comprising using well-specific equipment to perform one or more abandonment procedures.

14. The tangible computer readable medium of claim 13, wherein the operations further comprise:
receiving condition data that is specific to each of the at least two well types;
wherein the generation of the estimate of the cost of abandoning the set of wells is based at least in part on the condition data.

15. The tangible computer readable medium of claim 13, wherein the operations further comprise:
receiving a set of environmental conditions that affect a set of well abandonment activities for the set of wells;
wherein the generation of the estimate of the cost of abandoning the set of wells is based at least in part on the set of environmental conditions.

16. The tangible computer readable medium of claim 15, wherein the operations further comprise calculating an estimate of a duration of well abandonment activities for each well in the set of wells.

17. The tangible computer readable medium of claim 13, wherein the operations further comprise performing a risk assessment analysis on the sequence of well abandonment activities for the set of wells, the risk assessment analysis including an analysis of factors that may change the estimate of the cost of abandoning the set of wells or the initial sequence of well abandonment activities.

18. The tangible computer readable medium of claim 17, wherein the operations further comprise:
determining an optimized sequence of well abandonment activities based at least in part on the initial sequence of well abandonment activities; and
determining a schedule of well abandonment activities for each well in the set of well, the schedule based at least in part on the optimized sequence of well abandonment activities.

* * * * *